United States Patent [19]

Schmid

[11] 3,960,137

[45] June 1, 1976

[54] APPARATUS FOR FRYING FOOD BY IMMERSING IT IN BOILING OIL

[76] Inventor: Charles Schmid, 12 Chemin de Chantemerle, Orbe, Vaud, Switzerland

[22] Filed: Sept. 13, 1974

[21] Appl. No.: 505,985

[30] Foreign Application Priority Data
Sept. 25, 1973 Switzerland.................. 13813/73

[52] U.S. Cl............................... 126/387; 126/351; 126/374; 99/331; 99/403
[51] Int. Cl.².......................................... A47J 21/02
[58] Field of Search .......... 126/351, 387, 374, 390, 126/362; 99/331, 403; 219/43, 44

[56] References Cited
UNITED STATES PATENTS

| | | | |
|---|---|---|---|
| 1,907,265 | 5/1933 | Schwedersky | 126/387 |
| 2,136,535 | 11/1938 | Anetsberger | 126/387 |
| 2,154,391 | 4/1939 | Anderson | 126/390 |
| 3,217,633 | 11/1965 | Anetsberger | 99/403 |

FOREIGN PATENTS OR APPLICATIONS

| | | | |
|---|---|---|---|
| 459,332 | 6/1913 | France | 126/387 |

*Primary Examiner*—Carroll B. Dority, Jr.
*Assistant Examiner*—Larry I. Schwartz
*Attorney, Agent, or Firm*—Kurt Kelman

[57] ABSTRACT

The invention provides a method of frying food by immersing it in a bath of boiling oil, wherein at the same time as cold food is introduced into the bath, oil which has cooled in contact with the food is withdrawn from the bath and separately reheated before being reintroduced into the bath.

The invention also provides a deep-fryer for carrying out the method, the deep-fryer having a looped circulation duct which receives oil from part of a bottom portion of the oil bath and delivers the oil to another part of the bath, and means for heating oil passing through part of the circulation duct so that the oil flows in the duct due to a thermosiphon effect.

3 Claims, 9 Drawing Figures

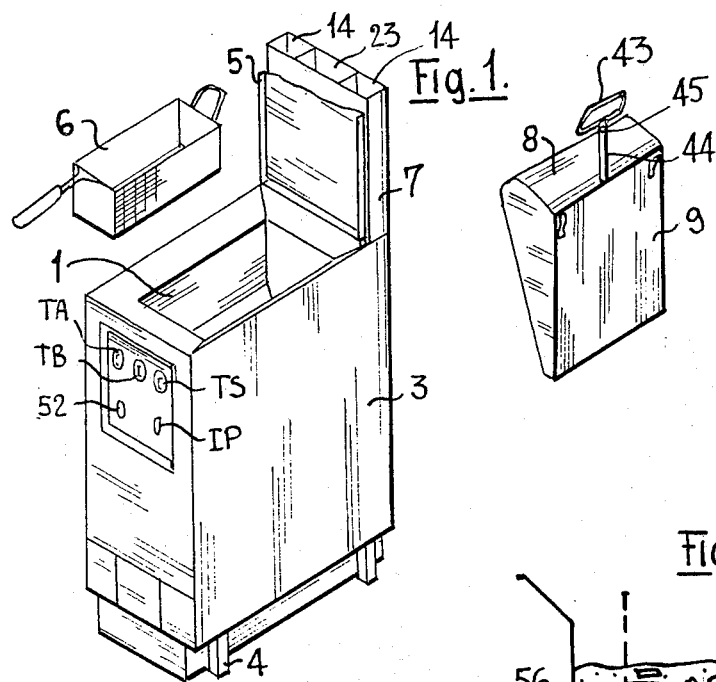
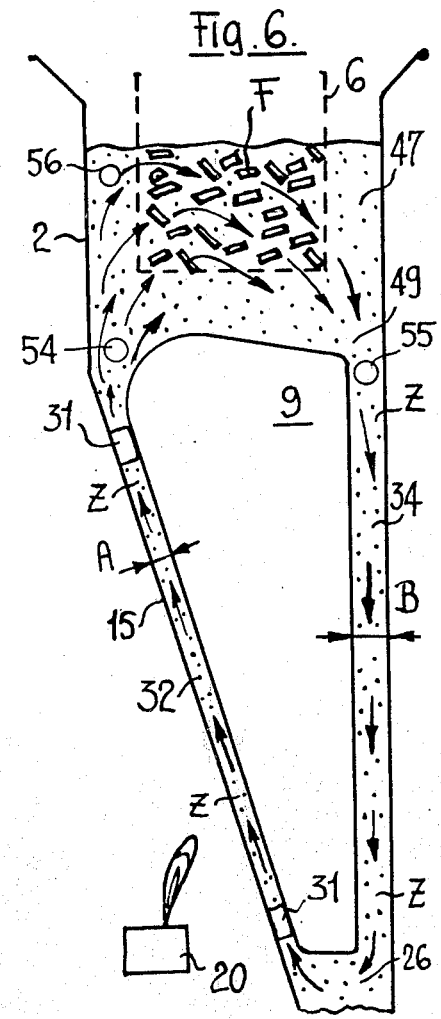
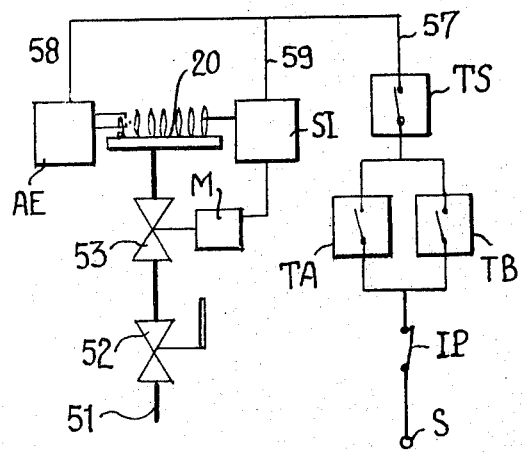

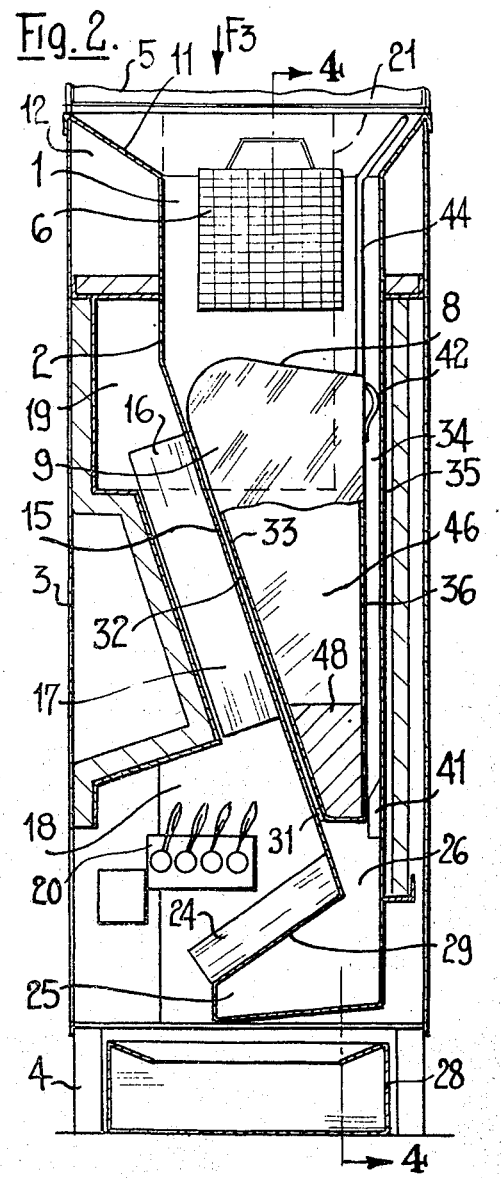
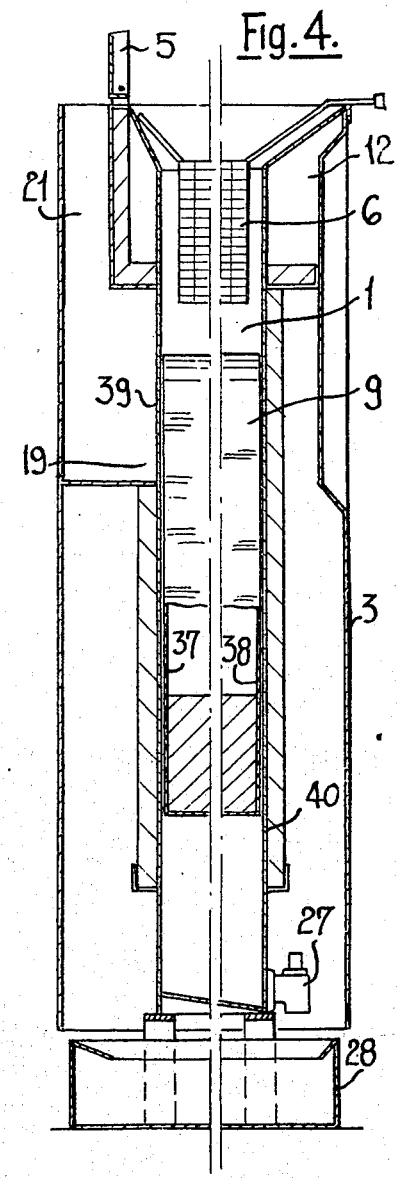
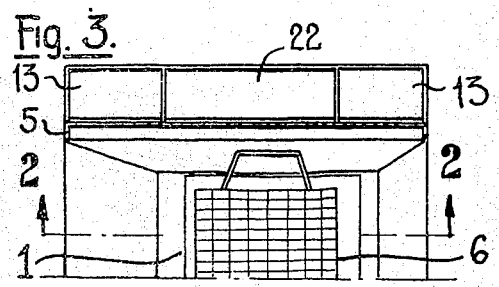

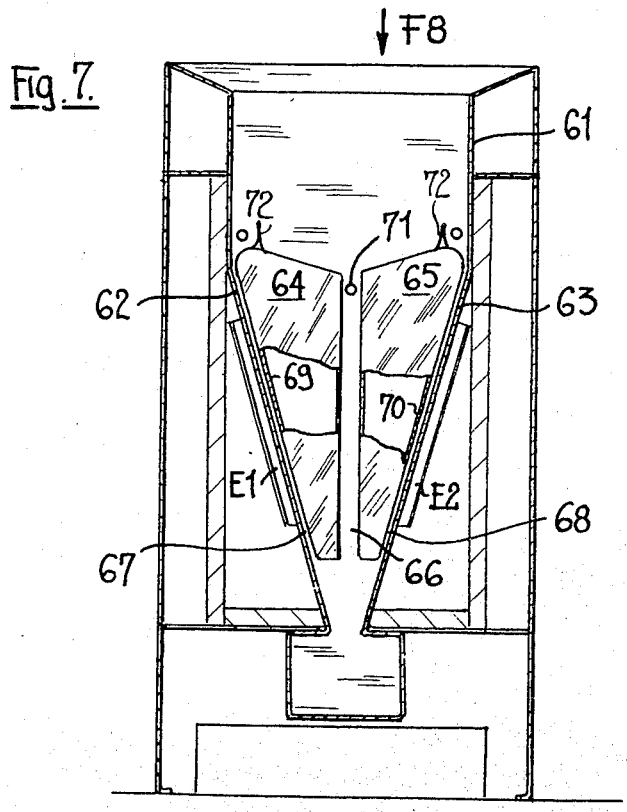
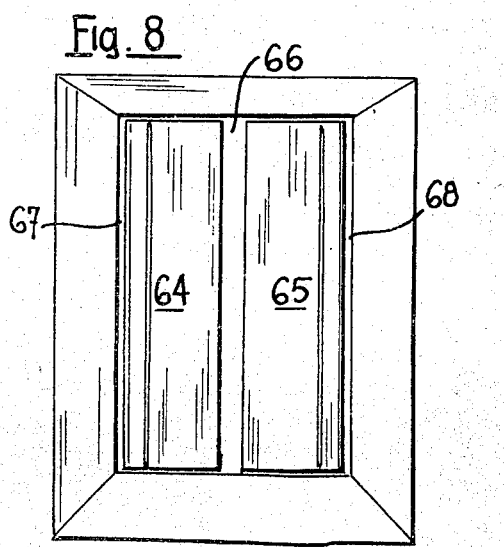
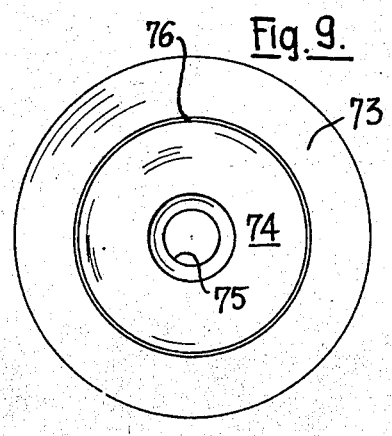

APPARATUS FOR FRYING FOOD BY IMMERSING IT IN BOILING OIL

FIELD OF THE INVENTION

This invention relates to a deep-fryer for frying food by immersing it in oil.

PRIOR ART

In a known method of frying food such as potatoes, the food is placed in a basket and immersed while cold in a bath of oil.

At the instant when the cold food is immersed, oil rapidly cools in contact with the food and the cooled oil mixes with the bath and lowers the temperature thereof. If the original bath temperature is 200°C. and potatoes at 20°C. are immersed therein, the temperature of the entire bath will fall to 150°C. for example. The bath then has to be re-heated, which takes an appreciable time, during which the food is immersed in insufficiently hot oil.

SUMMARY OF THE INVENTION

It is an object of the invention to obtain a more constant temperature, near the maximum acceptable temperature, of oil in the active part of an oil bath in a deep fryer.

According to a first aspect of the present invention there is provided a method of frying food by immersing it in a bath of boiling oil, wherein at the same time as cold food is introduced into the bath, oil which has cooled in contact with the food is withdrawn from the bath and separately re-heated before being reintroduced into the bath.

According to a second aspect of the present invention there is provided a deep-fryer for frying food in oil, which deep-fryer comprises a tank adapted to contain an oil bath, means adapted to provide a looped circulation duct in the tank, which circulation duct receives, in use of the deepfryer, oil from part of a bottom portion of the bath and delivers the oil to another part of the bath, and means adapted to heat oil passing through part of the circulation duct.

For a better understanding of the present invention and to show how the same may be carried into effect reference will now be made, by way of example, to the accompanying drawings in which:

BRIEF DESCRIPTION OF DRAWINGS

FIG. 1 shows a perspective view of a deep-fryer in accordance with the present invention, some removable components being shown separately;

FIG. 2 shows a cross-section in elevation of the deep-fryer shown in FIG. 1, on a larger scale, the cross-section being along line 2—2 in FIG. 3;

FIG. 3 is a partial plan view along arrow F3 of FIG. 2;

FIG. 4 shows a cross-section along line 4—4 of FIG. 2, omitting a central part of the cross-section;

FIG. 5 shows a block diagram of a gas appliance for heating the deep-fryer and of the electric control circuits therefor;

FIG. 6 shows a diagram illustrating the operation of the deep-fryer;

FIG. 7 shows a cross-section of another deep-fryer in accordance with the present invention;

FIG. 8 shows a plan view of the deep-fryer of FIG. 7, along arrow F8 in FIG. 7, and FIG. 9 shows a plan view of another deep-fryer in accordance with the present invention.

DESCRIPTION OF PREFERRED EMBODIMENTS

The deep-fryer shown in FIG. 1 comprises a rectangular frying vat 1 comprising the top part of a deep tank 2 disposed in a jacket 3 borne by feet 4. A hinged cover 5 is used to close the deep-fryer, which also comprises a movable basket 6 constructed in conventional manner from wire netting, and adapted to receive food for cooking. The gas-heated deep-fryer is adapted to be connected to a chimney 7 (FIG. 1).

In the top part of tank 2, the bottom of vat 1 is the top surface 8 of a removable filling member 9 disposed in tank 2. In FIG. 1, the filling member 9 is shown outside the tank.

At its top part, tank 2 has an external flange 11 forming the top wall of a chamber 12 connected by apertures 13 (FIG. 3) to air-circulation ducts 14 of chimney 7. Flange 11 is adapted to collect foam overflowing from the bath, and the air travelling through chamber 12 cools the flange and condenses the foam.

An inclined side wall 15 of tank 2 (FIG. 2) has outer fins 16 in a duct 17 forming a chimney between a bottom combustion chamber 18 comprising a gas burner 20 and a top chamber 19. Chamber 19 is connected via a duct 21 to an aperture 22 (FIG. 3) connected to a central duct 23 of chimney 7 for discharging burnt gases. Accordingly, wall 15 is a heating wall in the tank.

At its base, tank 2 has a settling chamber 25 connected to the rest of the tank by a constriction 26 and comprising an emptying cock 27 for discharging waste and water of condensation into a removable vessel 28. A wall 29 of chamber 25 has external cooling fins 24 which are swept by cold air travelling towards burner 20.

The filling member 9, which is a hollow sheet-metal component, occupies the central part of tank 2, except for two free spaces 32, 34 on two opposite sides of the tank (FIGS. 2 and 6). At the two sides of the tank, walls 37 and 38 of member 9 are contiguous with walls 39 and 40 of the tank, except for a very small clearance (FIG. 4).

The space 32 forms a thin slit between the heating wall 15 and a wall 33 of member 9. Space 32 has a width A (FIG. 6) of 3 mm, for example, which is precisely determined by blocks 31. For the sake of clarity, the width A is exaggerated in FIG. 6.

Space 34, which is a vertical well between wall 36 of member 9 and wall 35 of the tank, has a greater width B (FIG. 6) of 20 mm, for example, so that waste can fall to the settling chamber 25. Guides 41 and springs 42 (FIG. 2) hold the removable member 9 in the desired position.

Member 9 has a handle 43 (FIG. 1) comprising a tubular rod 44 provided with an aperture 45. Rod 44 forms a ventilation chimney for cavity 46 of member 9, which terminates above the level of the bath in vat 1. Body 9, which is completely immersed in the bath oil 47, is ballasted by a weight 48 and the chimney formed by rod 44 prevents an excess pressure occurring in member 9 when the oil is heated. Member 9 can easily be taken out for cleaning its walls or tank 2.

Space 34, constriction 26 and space 32 together form a loop circulation duct Z for the oil in vat 1 (FIG. 6). Space 34 forms a descending upstream part of the duct, starting from the bottom region 49 of the vat, and space 32 forms an ascending downstream portion returning to the vat. The heating wall 15 provides heating means adapted to heat the oil in the ascending part 32, so that oil flows in duct Z by a thermosiphon effect, as shown by the arrows in FIG. 6.

Burner 20 is supplied with gas from a supply pipe 51 via a manually controlled shut-off valve 52 and an electromagnetic shut-off valve 53 (FIG. 5).

The electric control circuit, starting from a current source S, comprises a main switch IP, two thermostats TA and TB disposed in parallel and having probes installed at 54 and 55 respectively in tank 2 (FIG. 6) and a thermostat TS which is connected in series and has a probe installed in the tank at 56. Thermostat TS has an output line 57 comprising an arm 58 supplying an electric igniter AE, and an arm 59 which supplies winding M of valves 53, via an ionization monitoring device SI.

The three thermostats comprise electric switches which remain closed as long as the corresponding probes do not reach 200°C. via TA, 190°C. via TB and 250°C. via TS, and which open when these tempertures are reached. The monitoring device SI, which is of conventional construction, comprises a switch and a timed relay which automatically opens the switch after 5 seconds if the burner flame has not been ignited.

During normal operation, the oil bath 47 filling the tank is first raised to approximately 200°C, by closing the main switch IP and supplying line 57 via thermostat TA adjusted to 200°C; the safety thermostat TS adjusted to 250°C. is also closed. When heat is applied by the heating wall 15, oil begins to circulate by the thermosiphon effect and gradually heats the entire bath to 200°C., at which temperature the thermostat TA opens and cuts off the supply to burner 20, since thermostat TB adjusted to 190°C. is also open. This preliminary heating occurs when the deep-fryer is started up.

A basket 6 contains food F for frying which is cold, at 20°C., for example. When basket 6 is immersed, the oil in contact with the food cools and descends by gravity to the bottom region 49 of the vat. The cooled oil makes contact with probe 55 of thermostat TB when it arrives at the inlet of space 34 forming the descending downstream part of duct Z. After the first few seconds, the temperature of the cooled oil falls below 190°C., which is the temperature at which thermostat TB is adjusted, so that the contact of thermostat TB closes and heating starts immediately.

From this instant, the oil is strongly heated in the ascending part 32 of the duct, so that oil flows rapidly in the direction of the arrows in FIG. 6, heavier cool oil sinking into the well formed by part 34 and lighter heated oil rising at high speed into the ascending part 32. The flow, which begins as soon as the cold food is immersed, is at a rate which will be in direct proportion to the temperature difference between the ascending hot oil and the descending cold oil. Note that the temperature of the reheated oil flowing out of space 32 may, of course, exceed 200°C., since the heating and the flow continue until the temperature of the cooled oil reaching space 34 is not less than 190°C. Accordingly, the heating power of burner 20 will be fully used, without any external intervention, as soon as the food for frying has been immersed, as long as the heating of the food is likely to result in appreciable cooling of the bath. Any danger of overheating is prevented by thermostat TS which is adjusted to 250°C. and has a probe 56 disposed at the top of the bath.

In the deep-fryer described above, therefore, the flow duct Z (FIG. 6) is used, as soon as cold food F has been introduced into the bath, to withdraw from the bath oil which has cooled in contact with the food and reheat it in the ascending part 32 of the circuit, separately from the rest of the bath, before re-introducing it into vat 1.

Consequently, the food for frying is constantly sprayed with very hot oil. If, for example, the thermostats are adjusted at the aforementioned temperatures, the food is initially immersed in oil at 200°C., is then sprayed with oil at 210°C. when the flow begins (since the oil at 200°C. in the circuit is heated to 210°C. when the heating means are switched on), and is then sprayed with oil at a temperature which may subsequently drop to approximately 195°C. before finally becoming constant at 200°C. As can be seen, the temperature drop is very slight compared with the desired 200°C.

During the entire cooking operation, the oil actually brought into contact with food F will be at an average temperature very near 200°C., whereas the temperature of the cooled oil withdrawn by the heating circuit may fall much lower, to 120°C., for example.

Accordingly, since cooled oil is withdrawn into a branch circuit, the bath assembly is not appreciably cooled and the cooking time is considerably reduced. The quality of cooking is also better, since the food is acted upon more quickly.

Another advantage is that the oil is heated in space 32, which has a cross-section in the form of a thin slit. More heating power can be transmitted, since the oil flows at high speed in contact with wall 15, while maintaining the surface temperature of the wall only slightly above the desired oil temperature. This prevents overheating and carbonisation of the oil in contact with the heating wall. The adjustable thermostats, TA, TB AND TS are provided with control knobs bearing the same references, which are installed on a panel on the deep-fryer (FIG. 1).

In the deep-fryer shown in FIGS. 7 and 8, tank 61 has heating walls 62 and 63, the heating means being electric resistors E1 and E2 disposed behind walls 62 and 63. The tank contains two removable filling members 64 and 65 which are disposed, for example, in the same manner as the aforementioned filling member 9. Members 64 and 65 are separated from one another by a central well 66 forming the descending upstream part of circulation ducts whose ascending downstream parts comprise two free spaces 67, 68 left between the outer walls 69 and 70 of the two filling members and the facing walls 62, 63 of the tank.

A probe 71 disposed at the inlet of well 66 switches on the heating as soon as oil cooled by contact with the food reaches the well inlet. In an alternative embodiment, heating resistors may also be disposed inside the filling members against their outer walls 69 and 70.

Deflectors of the kind shown at 72 may also be provided on the filling members in order more efficiently to separate the downward flow of cooled oil from the upward flow of reheating oil.

In the deep-fryer shown in FIG. 9, the frying vat is the top part of a circular tank 73, the bottom of which is occupied by a filling member 74 having the shape of a solid of revolution. A central well 75 forms the descending upstream part of the circulation duct, whose ascending downstream part is a free annular space 76 formed at the periphery of the filling member between the wall thereof and the wall of the tank, which comprises heating means.

I claim:
1. A deep-fryer for frying food in oil, comprising
   1. a deep tank having two opposed side walls defining a central part of the tank therebetween, an upper part thereabove and a settling chamber therebelow,
   2. a removable filling member mounted in the central part of the deep tank, the filling member having two opposed side walls adjacent respective ones of the tank side walls and an upper wall,
      a. the upper wall of the filling member delimiting a frying vat in the tank for an oil bath wherein the food is immersed for frying,
      b. one of the tank side walls and the adjacent filling member side wall defining an upstream oil circulation duct portion beginning at the upper filling member wall and in communication with the frying vat,
      c. the other tank side wall and the filling member side wall adjacent thereto defining a downstream oil circulation duct portion constituted by a narrow slit and ending at the upper filling member wall, the slit being in communication with the upstream duct portion and the frying vat, the upstream and downstream duct portions forming a looped circulation duct for the oil, and
      d. the settling chamber being in communication with the central part of the tank through a constricted passage arranged between the upstream and downstream duct portions,
   3. means for heating the other tank side wall and thus to heat the oil ascending in the narrow slit into the frying vat while oil cooled in the frying vat descends through the upstream oil circulation duct, the descending oil depositing waste and water of condensation by gravity through the constricted passage into the settling chamber, and the cooled oil passing into the narrow slit to be heated therein, and
   4. an emptying cock for discharging the waste and water of condensation from the settling chamber.

2. The deep-fryer of claim 1, wherein the filling member is hollow, the two opposed side walls thereof defining a cavity within the filling member, and the filling member comprises a handle including a tubular rod with an aperture above the level of the oil bath and in communication with the cavity whereby the rod forms a ventilation chimney for the cavity.

3. A deep-fryer for frying food in oil, comprising
   1. a deep tank having two opposed side walls defining a central part of the tank therebetween, an upper part thereabove and a setting chamber therebelow,
   2. two removable filling members mounted in the central part of the deep tank, each of the filling members having two opposed side walls and an upper wall, one of the opposed side walls of each filling member being adjacent respective ones of the tank side walls and the other ones of the opposed filling member side walls being adjacent each other,
      a. the upper walls of the filling members delimiting a frying vat in the tank for an oil bath wherein the food is immersed for frying,
      b. the two other opposed filling member side walls defining an upstream oil circulation duct portion beginning at the upper filling member walls and in communication with the frying vat, the upstream duct portion extending centrally through the central part of the tank,
      c. the one side walls of the filling members and the adjacent tank side walls defining two downstream oil circulation duct portions ending at the upper filling member walls and in communication with the upstream duct portion and the frying vat, the upstream and downstream duct portions forming a looped circulation duct for the oil, and
      d. the setting chamber being in communication with and arranged between the upstream and downstream duct portions, and
   3. means for heating the tank side walls and thus to heat the oil ascending through the downstream duct portions into the frying vat.

\* \* \* \* \*